United States Patent Office 3,287,419
Patented Nov. 22, 1966

3,287,419
3,3′-OXYBIS(2,2-DISUBSTITUTED-1-PROPANOLS)
Roy B. Duke, Jr., and Milton A. Perry, Longview, Tex., assignors to Eastman Kodak Company, Rochester, N.Y., a corporation of New Jersey
No Drawing. Filed Aug. 16, 1962, Ser. No. 217,267
11 Claims. (Cl. 260—615)

This invention relates to 3,3′-oxybis(2,2-disubstituted-1-propanols), and to a process for their preparation.

The new compounds of the invention are represented by the following general formula:

I. 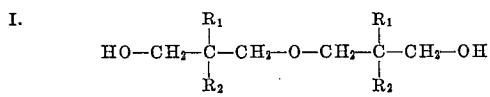

wherein each $R_1$ and $R_2$ represent an alkyl, alkenyl, alkynyl, alicyclic, aromatic, substituted aromatic, heterocyclic or halogen group or any combination of these groups, but preferably an alkyl group of from 1–6 carbon atoms, e.g. methyl, ethyl, propyl, isopropyl, n-butyl, sec.-butyl, n-hexyl, etc. groups. The new ethereal-glycol compounds of the invention above described are useful as hydraulic fluids, polyurethane extenders, lubricants, solvents and intermediates. Esters prepared with the above glycols and various monobasic acids, such as, for example, acetic, propionic, butyric, benzoic, etc. acids are excellent plasticizers in polyvinyl chloride, cellulose acetate, cellulose butyrate and polyacrylate formulations. Both the aliphatic and aromatic esters of the ethereal-glycols of the invention make good synthetic lubricants. It is believed that the absence of alpha-hydrogens on the glycol nucleus is the reason why the glycols per se and esters prepared therefrom have good oxidative and thermal stability. The ethereal-glycols of the invention are further useful in the preparation of high molecular weight polyesters with dibasic acids such as adipic, sebacic, terephthalic, etc. acids, imparting unusual properties for textile and coating applications; for example, the lower members of the series imparting crystallinity to such polyester systems.

It is an object of the invention, therefore, to provide a new class of valuable ethereal-glycols as above defined. Another object is to provide a new class of hydraulic fluids, polyurethane extenders, lubricants, solvents and intermediates. Another object is to provide a process for preparing the new ethereal-glycols. Other objects will become apparent hereinafter.

In accordance with the invention, we prepare our new ethereal-glycols by hydrogenating a polymer whose structure is set forth below, either chemically or catalytically as illustrated by the reaction:

II. 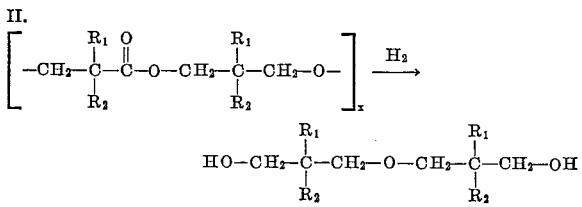

wherein each $R_1$ and $R_2$ is as previously defined and $x$ represents a positive whole number indicating that the structure within the bracket recurs $x$ number of times, i.e. about from 4 to 15, to give a polymeric product. It is also possible to start with aldan type of polymers represented by the general structure:

III. 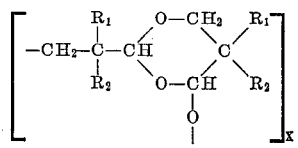

wherein $R_1$, $R_2$ and $x$ are as previously defined, which polymers are believed to be the precursors of the polymeric esters represented by above structure II. The ester linkage could easily be formed in structure III by simple hydrogen transfer. However, regardless of whether the starting polymer is an ester, or an aldan, or a mixture of the two, both reduce readily to yield the ethereal-glycols of the invention.

Accordingly, for the purpose of this invention, the polymers of above structures II and III can be considered as practically equivalents. It will be understood, however, that the ester polymers represented by above structure II are the preferred starting materials. Advantageously, the hydrogenation or reduction reaction can be carried out in an inert solvent medium, for example, in ether, benzene, toluene, and the like solvents. The reaction can also be effected in mass. The temperature can vary widely, but preferably from about the normal refluxing temperatures of the solvent medium for the chemical hydrogenations to relatively higher temperatures for the catalytic hydrogenations, i.e. an overall reduction temperature in the range of from about 30–300° C.

In the case of the catalytic hydrogenations, these are advantageously carried out in an autoclave at pressures ranging from about 250–10,000 pounds per square inch, but preferably from about 3000–6000 pounds per square inch, in the presence of a suitable catalyst. This can be any of the metal or metal compound catalysts of the type well known and customarily referred to in the art as hydrogenation catalysts, for example, Raney nickel, copper chromite, palladium, platinum, ruthenium, rhodium, cobalt compounds, and the like. For the chemical hydrogenations, an alkali metal such as lithium, sodium, etc. can be used. However, an ethereal solution of lithium aluminum hydride is especially efficacious. On completion of the hydrogenation reaction, the ethereal-glycol produced can be separated from the reaction mixture by conventional separation means such as filtering, crystallizing, etc.

Under normal conditions, the ethereal-glycols of the invention are crystalline solids having melting points in the range of from about —10° to 100° C.

The intermediate polymers that are hydrogenated as above described may be prepared by the acid catalyzed dehydration of tertiary formaldols of the general structure:

IV. 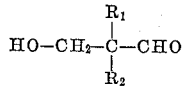

wherein $R_1$ and $R_2$ are as previously defined. Suitable acid catalysts include mineral acids such as sulfuric, hydrochloric, phosphoric, etc. acids, or Lewis-acids such as aluminum chloride, boron trifluoride, stannic chloride, etc., or sulfonic acids such as p-toluene sulfonic acid. The reaction proceeds with the elimination of one-half mole of water for every mole of aldol. The polymerization is conveniently carried out in a solvent such as benzene which forms an azeotrope with water, thus removing the latter as it is formed. The resulting polymers may then be isolated by distilling off the solvent or by precipitating the polymer from an appropriate solvent system. They range in molecular weight from about 1000–3000. Apparently these polymers are aldehyde-group terminated, since it is possible to oxidize or reduce the carbonyl group therein so as to terminate the polymer either as a dibasic acid or a diol.

The following examples illustrate further the manner whereby we practice our invention.

*Example 1.—Preparation of the intermediate polymers*

(a) 480 g. of 2,2-dimethyl-3-hydroxypropanal were dissolved in 800 ml. of benzene and heated to reflux in a stirred flask equipped with a Dean-Stark trap and condenser. The aldol had been previously recrystallized from water and was still wet; therefore, refluxing was continued until the system was entirely free of water. Concentrated sulfuric acid was then added dropwise until the polymerization reaction initiated. After refluxing for 20 hours, 27.5 ml. of water was collected. Using the water collected during polymerization as an effective measure of the aldol, it was indicated that 312 g. (3.05 moles) of 2,2-dimethyl-3-hydroxypropanal were initially present in the reaction mixture. Following the polymerization step, the benzene was distilled off and the residual polymer was susbsequently stripped to 300° C. at 1 mm. pressure. The yield of polymer was 221.5 g. (77% of theoretical). It was a clear, light yellow solid at room temperature and a molceular weight of 1716.

(b) A mixture of 70 g. of 2,2-dimethyl-3-hydroxypropanal and 200 ml. of toluene was heated to reflux in a 3-necked flask equipped with a stirrer, a Dean-Stark trap and a condenser. Two drops of phosphoric acid were added to catalyze the polymerization reaction. Upon refluxing 20 hours, 6.3 ml. of water was collected. Additional water (500 ml.) was then added to the mixture and the toluene was removed by distillation as its water azeotrope. The polymer which had formed precipitated from the aqueous solution, and after filtering it out and drying for several hours at 200° C., there was obtained 44.5 g. (71 % of calculated theory) of a light yellow polymer which was solid at room temperature and had an estimated molecular weight of 1250.

(c) 207 g. of 2-ethyl-2-butyl-3-hydroxypropanal were dissolved in 500 ml. of benzene and the solution heated to reflux in a stirred flask equipped with a Dean-Stark trap and condenser. Refluxing was continued until all residual water was removed from the system; then two drops of concentrated sulfuric acid were added. The refluxing was continued for 5 hours more during which time 10 ml. of water was collected. The reaction mixture was then distilled to remove the remaining benzene, and the residual polymer in the flask was subsequently stripped to 150° C. at 2 mm. pressure. The resulting polymer (160) g. was a heavy viscous oil at room temperature. The conversion was estimated at 81% of calculated theory.

*Example 2.—Preparation of 3,3'-oxybis(2,2-dimethyl-1-propanol)*

(a) A polymeric composition prepared according to above Example 1(a) was dissolved in ether, and this solution was then added dropwise to an etheral solution of lithium aluminum hydride. After completion of the addition, the mixture was refluxed for two hours and then hydrolyzed. The etheral layer produced was separated and the ether removed therefrom on a steam bath. The reduced product was then distilled and subsequently recrystallized from hexane. Pure 3,3'-oxybis(2,2-dimethyl-1-propanol) was isolated and identified by its infrared spectrum and melting point of 87.5–89° C. A polyester prepared from equimolar proportions of the above diol and terephthalic acid showed marked thermal stability as compared with similar polyesters prepared with conventional ether-diols such as diethylene glycol, dipropylene glycol, etc.

In place of the polymeric composition in the above example, there may be substituted an equivalent amount of the polymeric product obtained by the acid catalyzed dehydration of 3-hydroxy-2,2-diethyl-propanal to give the corresponding ether-diol 3,3'-oxybis(2,2-diethyl-1-propanol) which has generally similar chemical and physical properties and utility.

*Example 3*

A polymer composition prepared according to above Example 1(b) was dissolved in benzene and reduced in an autoclave at 250° C. and 5000 p.s.i.g. of $H_2$ gas over copper chromite catalyst. On completion of the reaction, the catalyst was filtered out and the benzene then removed by distillation. The residual crude diol product was purified by recrystallization from hexane. It was identified as 3,3'-oxybis(2,2-dimethyl-1-propanol) from its melting point and infrared spectrum.

*Example 4*

A polymeric cmposition prepared according to above Example 1(c) was reduced at 280° C. with $H_2$ gas over copper chromite catalyst at a pressure of 5000 p.s.i.g. After filtering off the catalyst, the diol was distilled collecting a fraction boiling 164–166° C. at 1 mm. pressure. This product was identified by its infrared spectrum as 3,3' - oxybis(2-ethyl - 2-butyl-1-propanol). A polyester prepared from equimolar quantities of the above diol and and terephthalic acid likewise showed unusual stability to thermal degradation as compared to similar polyesters produced with conventional ether-diols such as diethylene glycol, dipropylene glycol, etc.

In place of the polymeric composition in the above example, there may be substitued an equivalent amount of the polymeric product obtained by the acid catalyzed dehydration of 2-methyl-2-ethyl-3-hydroxy-propanol to the corresponding ether-diol 3,3'-oxybis(2-methyl-2-ethyl-1-propanol), or an equivalent amount of the polymeric product obtained by the acid catalyzed dehydration of 2-methyl-2-propyl-3-hydroxy-propanal to give the corresponding ether-diol 3,3'-oxybis(2-methyl-2-propyl-1-propanol), or an equivalent amount of the polymeric product obtained by the acid catalyzed dehydration of 2-methyl-2-n-butyl-3-hydroxy-propanal to give the corresponding ether-diol 3,3'-oxybis(2-methyl-2-n-butyl-1-propanol), all having generally similar chemical and physical properties and utility.

By following the precedures of the above examples, other species of ether-diols coming within the invention can be preferred. Thus any of the polymeric compositions within the limits of above structures II and III can be substituted in Examples 2–4 to give the corresponding ether-diols, for example, 3,3'-oxybis(2,2-di-n-hexyl-1-propanol), 3,3'-oxybis(2-ethyl-2-phenyl-1-propanol), 3,3'-oxybis(2,2-diphenyl-1-propanol), 3,3'-oxybis(2,2-dicyclohexyl-1-propanol), etc., which likewise are useful as hydraulic fluids, polyurethane extenders, lubricants, solvents and intermediates.

The invention has been described in detail with particular reference to preferred embodiments thereof, but it will be understood that variations and modifications can be effected within the spirit and scope of the invention as hereinabove described and as defined in the appended claims.

What we claim is:

1. A process for preparing 3,3'-oxbyis(2,2-disubstituted-1-propanols) represented by the following structural formula:

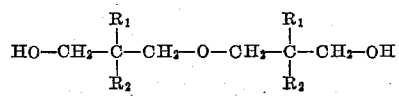

wherein each $R_1$ and $R_2$ represents a member selected from the group consisting of an alkyl group having from 1–6 carbon atoms, a cyclohexyl radical, and phenyl radical; which process comprises hydrogenating in the presence of a hydrogenation catalyst, at a temperature of from 30–300° C., a polymeric product having a structure selected from the group consisting of $$\left[-CH_2-\underset{\underset{R_2}{|}}{\overset{\overset{R_1}{|}}{C}}-\overset{O}{\overset{\|}{C}}-O-CH_2-\underset{\underset{R_2}{|}}{\overset{\overset{R_1}{|}}{C}}-CH_2-O-\right]_x$$

and $$\left[-CH_2-\underset{\underset{R_2}{|}}{\overset{\overset{R_1}{|}}{C}}-\overset{\overset{O-CH_2}{\diagup}}{\underset{\underset{O-CH}{\diagdown}}{CH}}\underset{\underset{\underset{|}{O}}{|}}{\overset{\diagup}{\underset{\diagdown}{C}}}\overset{R_1}{\underset{R_2}{}}\right]_x$$

wherein $R_1$ and $R_2$ are as above defined and X is a whole number of from 4 to about 15; and having a molecular weight of from about 1000 to about 3000.

2. A process for preparing 3,3'-oxybis (2,2-dialkyl-1-propanols) represented by the following structural formula:

$$HO-CH_2-\underset{\underset{R_2}{|}}{\overset{\overset{R_1}{|}}{C}}-CH_2-O-CH_2-\underset{\underset{R_2}{|}}{\overset{\overset{R_1}{|}}{C}}-CH_2-OH$$

wherein each $R_1$ and $R_2$ represents an alkyl group having from 1 to 6 carbon atoms; which process comprises hydrogenating in the presence of a hydrogenation catalyst, at a temperature of from 30–300° C., a polymeric product having a structure selected from the group consisting of $$\left[-CH_2-\underset{\underset{R_2}{|}}{\overset{\overset{R_1}{|}}{C}}-\overset{O}{\overset{\|}{C}}-O-CH_2-\underset{\underset{R_2}{|}}{\overset{\overset{R_1}{|}}{C}}-CH_2-O-\right]_x$$

and $$\left[-CH_2-\overset{}{C}-\overset{\overset{O-CH_2}{\diagup}}{\underset{\underset{O-CH}{\diagdown}}{CH}}\underset{\underset{\underset{|}{O}}{|}}{\overset{\diagup}{\underset{\diagdown}{C}}}\overset{R_1}{\underset{R_2}{}}\right]_x$$

wherein $R_1$ and $R_2$ are as above defined and X is a whole number of from 4 to about 15; and having a molecular weight of from about 1000 to about 3000.

3. A process for preparing 3,3'-oxybis(2,2-dimethyl-1-propanol) which comprises hydrogenating in the presence of a hydrogenation catalyst, at a temperature of from 30–300° C., a polymeric product having a molecular weight of from 1000 to about 3000 and having a structure selected from the group consisting of $$\left[-CH_2-\underset{\underset{CH_3}{|}}{\overset{\overset{CH_3}{|}}{C}}-\overset{O}{\overset{\|}{C}}-O-CH_2-\underset{\underset{CH_3}{|}}{\overset{\overset{CH_3}{|}}{C}}-CH_2-O-\right]_x$$

and $$\left[-CH_2-\underset{\underset{CH_3}{|}}{\overset{\overset{CH_3}{|}}{C}}-\overset{\overset{O-CH_2}{\diagup}}{\underset{\underset{O-CH}{\diagdown}}{CH}}\underset{\underset{\underset{|}{O}}{|}}{\overset{\diagup}{\underset{\diagdown}{C}}}\overset{CH_3}{\underset{CH_3}{}}\right]_x$$

wherein X is a whole number of from 4 to about 15.

4. A process for preparing 3,3'-oxybis(2,2-diethyl-1-propanol) which comprises hydrogenating in the presence of a hydrogenation catalyst, at a temperature of from about 30–300° C., the polymeric product having a molecular weight of from about 1000 to 3000 and having a structure selected from the group consisting of $$\left[-CH_2-\underset{\underset{CH_2CH_3}{|}}{\overset{\overset{CH_2CH_3}{|}}{C}}-\overset{O}{\overset{\|}{C}}-O-CH_2-\underset{\underset{CH_2CH_3}{|}}{\overset{\overset{CH_2CH_3}{|}}{C}}-CH_2-O-\right]_x$$

and $$\left[-CH_2-\underset{\underset{CH_2CH_3}{|}}{\overset{\overset{CH_2CH_3}{|}}{C}}-\overset{\overset{O-CH_2}{\diagup}}{\underset{\underset{O-CH}{\diagdown}}{CH}}\underset{\underset{\underset{|}{O}}{|}}{\overset{\diagup}{\underset{\diagdown}{C}}}\overset{CH_2CH_3}{\underset{CH_2CH_3}{}}\right]_x$$

wherein X is a whole number of from 4 to about 15.

5. A process for preparing 3,3'-oxybis(2-methyl-2-ethyl-1-propanol) which comprises hydrogenating in the presence of a hydrogenation catalyst, at a temperature of from 30–300° C., the polymeric product having before hydrogenation a molecular weight of from about 1000 to about 3000 and having a structure selected from the group consisting of $$\left[-CH_2-\underset{\underset{CH_2CH_3}{|}}{\overset{\overset{CH_3}{|}}{C}}-\overset{O}{\overset{\|}{C}}-O-CH_2-\underset{\underset{CH_2CH_3}{|}}{\overset{\overset{CH_3}{|}}{C}}-CH_2-O-\right]_x$$

and $$\left[-CH_2-\underset{\underset{CH_2CH_3}{|}}{\overset{\overset{CH_3}{|}}{C}}-\overset{\overset{O-CH_2}{\diagup}}{\underset{\underset{O-CH}{\diagdown}}{CH}}\underset{\underset{\underset{|}{O}}{|}}{\overset{\diagup}{\underset{\diagdown}{C}}}\overset{CH_3}{\underset{CH_2CH_3}{}}\right]_x$$

wherein X is a whole number of from 4 to about 15.

6. A process for preparing 3,3'-oxybis(2-methyl-2-n-butyl-1-propanol) which comprises hydrogenating in the presence of a hydrogenation catalyst, at a temperature of from 30–300° C., the polymeric product having a molecular weight of from about 1000 to about 3000 and having a structure selected from the group consisting of $$\left[-CH_2-\underset{\underset{CH_2CH_2CH_3}{|}}{\overset{\overset{CH_3}{|}}{C}}-\overset{O}{\overset{\|}{C}}-O-CH_2-\underset{\underset{CH_2CH_2CH_3}{|}}{\overset{\overset{CH_3}{|}}{C}}-CH_2-O-\right]_x$$

and $$\left[-CH_2-\underset{\underset{CH_2CH_2CH_3}{|}}{\overset{\overset{CH_3}{|}}{C}}-\overset{\overset{O-CH_2}{\diagup}}{\underset{\underset{O-CH}{\diagdown}}{CH}}\underset{\underset{\underset{|}{O}}{|}}{\overset{\diagup}{\underset{\diagdown}{C}}}\overset{CH_3}{\underset{CH_2CH_2CH_3}{}}\right]_x$$

wherein X is a whole number of from 4 to about 15.

7. The process according to claim 3 wherein said hydrogenation catalyst is lithium aluminum hydride.

8. The process according to claim 3 wherein the hydrogenation is carried out in the presence of hydrogen at a pressure of from 250–10000 pounds per square inch, and wherein the said catalyst is copper chromite.

9. The process according to claim 6 wherein the hydrogenation is carried out in the presence of hydrogen at a pressure of from 250–10000 pounds per square inch, and wherein the said catalyst is copper chromite.

10. A process for preparing 3,3'-oxybis(2,2-dicyclohexyl-1-propanol) which comprises hydrogenating in the presence of a hydrogenation catalyst, at a temperature of from 30–300° C., the polymeric product having molecular weight of from about 1000 to about 3000 and having a structure selected from the group consisting of

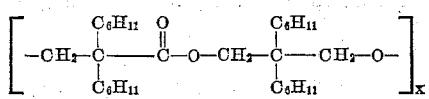

and

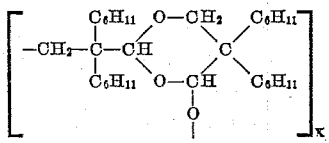

wherein X is a whole number of from 4 to about 15.

11. A process for preparing 3,3'-oxybis(2,2-diphenyl-1-propanol) which comprises hydrogenating in the presence of a hydrogenation catalyst, at a temperature of from 30–300° C., the polymeric product having a molecular weight of from about 1000 to about 3000 and having a structure selected from the group consisting of

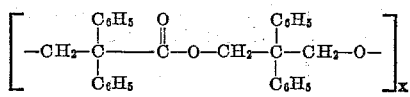

and

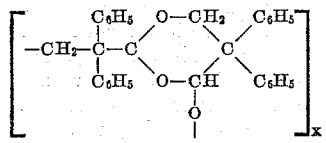

wherein X is a whole number of from 4 to about 15.

References Cited by the Examiner
UNITED STATES PATENTS

| | | | |
|---|---|---|---|
| 2,285,448 | 6/1942 | Loder | 260—635 |
| 2,467,798 | 4/1949 | Alexander et al. | 260—615 |
| 2,607,805 | 8/1952 | Gresham | 260—635 |
| 2,975,218 | 3/1961 | Buchner et al. | 260—635 |
| 3,073,848 | 1/1963 | Wasson et al. | 260—635 |

FOREIGN PATENTS 802,186  10/1958  Great Britain.

OTHER REFERENCES

Curme et al.: Glycols (1952), page 207.

LEON ZITVER, *Primary Examiner.*

B. HELFIN, *Assistant Examiner.*